United States Patent [19]

Dickson

[11] 3,933,473

[45] Jan. 20, 1976

[54] METHOD FOR RECOVERING A USABLE ALLOY FROM TITANIUM SCRAP

[75] Inventor: James Dickson, Stirling, N.J.

[73] Assignee: Airco, Inc., Murray Hill, New Providence, N.J.

[22] Filed: Oct. 19, 1973

[21] Appl. No.: 408,237

[52] U.S. Cl. .................................. 75/10 R; 75/84
[51] Int. Cl.² ......................................... C22B 4/06
[58] Field of Search .............................. 75/10, 84

[56] References Cited
UNITED STATES PATENTS

| | | | |
|---|---|---|---|
| 2,548,897 | 4/1951 | Kroll | 75/10 R |
| 2,734,244 | 2/1956 | Herres | 75/10 R |
| 2,813,921 | 11/1957 | Vordahl | 75/10 R |
| 2,866,700 | 12/1958 | Bohnet | 75/10 R |
| 3,005,246 | 10/1961 | Murphy | 75/10 R |
| 3,342,250 | 9/1967 | Treppschuh | 75/10 R |
| 3,660,074 | 5/1972 | Buehl | 75/10 R |

*Primary Examiner*—Peter D. Rosenberg
*Attorney, Agent, or Firm*—Larry R. Cassett; Edmund W. Bopp; H. Hume Mathews

[57] ABSTRACT

A method for recovering a usable alloy consisting of 2.5 – 3.5% aluminum, 1.7 – 2.50% tin and balance titanium from titanium scrap is disclosed. The method comprises cleaning the scrap, charging the cleaned scrap into an electron beam furnace and refining the charge under a hard vacuum so as to attain a predetermined composition.

10 Claims, No Drawings

METHOD FOR RECOVERING A USABLE ALLOY FROM TITANIUM SCRAP

BACKGROUND OF THE INVENTION

1. Field of the Invention

The present invention relates in general to a method for recovering a usable alloy from scrap or secondary materials. It more specifically relates to a method for obtaining a titanium alloy by refining a charge of titanium scrap in an electron beam furnace.

2. Description of the Prior Art

Titanium ingots are generally obtained by consumable-electrode arc melting a pressed electrode. For example there is disclosed in U.S. Pat. No. 2,686,822, issued to R. E. Evans et al, a pressed consumable electrode comprising granular titanium admixed with various alloying elements. Evans et al melt the consumable electrode in a gas tight furnace containing an inert atmosphere; however, remelting can also be accomplished in a vacuum environment.

Double melting is usually employed to insure homogeneity. The use of vacuum melting for the production of ingots eliminates impurities found in sponge titanium such as hydrogen and magnesium chloride. Therefore the highest quality titanium ingots are obtained from consumable-electrode vacuummelted ingots. As used herein titanium sponge is that product obtained by the reduction of titanium tetrachloride by magnesium or sodium.

Because of titanium's density of about 0.16 pounds per cubic inch (compared with steel at 0.28) and the strength of titanium alloys at elevated temperatures the largest consumer of titanium for structural applications has been the aerospace and aircraft industry. For example, extensive use of titanium alloy forgings and bars are found in air frames and jet engine construction. In the construction of rocket nozzles and large diameter rings for jet engines, stringent quality requirements must be met. Therefore titanium starting stock must be in a very pure state. For this reason cast consumable-electrode vacuum melted ingots are employed. The cast ingot is converted into a billet by any conventional means such as by forging. The forged billet is thermomechanically worked, heat treated and machined to final dimensions.

A forged billet weighing approximately 900 pounds will produce a finishsed large diameter ring weighing approximately 150 pounds. When the solid billet is converted into a ring-shaped blank, there is substantial material loss in the form of punch-outs, croppings, scale and machine turnings. Since the larger pieces such as end croppings and punch-outs are relatively uncontaminated they can be returned to the ingot producer and remelted as prime charge materials.

The largest material loss is in the form of machine turnings and chips. Utilization of scrap in this form presents an entirely different problem. First of all the turnings and chips are contaminated with machine lubricants, scale and minute pieces of tool bits. Secondly, the analysis of the alloy has been altered. It is well known that titanium has a natural affinity for oxygen and nitrogen. During machining of the titanium stock the resultant chips and turnings become very hot. It is this combination of the elevated temperature and large surface area of the scrap that results in the titanium combining with atmospheric oxygen and nitrogen. Furthermore, the carbon content on the surface of the scrap is also increased as a result of the hot surface reacting with the cutting lubricant.

Some of this machine scrap can be reclaimed and reused by merely removing the machine oil and loose scale. For example, non-tin bearing titanium scrap reclaimed in this manner can be employed in the steel industry as an alloying addition. However, many titanium alloys containing tin as an alloying addition generate large quantities of scrap that cannot be used in the steel industry. Titanium scrap can also be employed in the electronics industry as a gettering agent. However the quantity of scrap that is used for this application is far exceeded by the quantity of turnings that are accumulated.

Recently U.S. Pat. No. 3,646,175 was issued to Bomberger et al for a method wherein machine turnings and other pieces of scrap could be reshaped into an intermediate product. This intermediate product is in the form of pellets or flakes which are thereafter blended with sponge metal. The blend can then be used to make up a pressed electrode for a melting charge.

The problems therefore confronting the prior art can be enumerated as follows:

Tin-bearing titanium scrap cannot be utilized as an alloying addition in the steel industry.

Vacuum arc re-melting and other commercial melting processes cannot consistently produce weldable, corrosion resistant forgeable stock from a scrap charge containing machine turnings because of high levels of carbon, nitrogen and oxygen.

Present commercial melting techniques cannot employ a 100% scrap charge and yield a usable product.

Titanium alloys in the form of machine turnings containing alpha stabilizers such as aluminum and tin and a high interstitial level including oxygen, carbon and nitrogen cannot be remelted and yield a usable product because of the poor physical properties of the resultant product.

Titanium machine turnings accumulate at a faster rate than they can be reclaimed and consumed.

The aforementioned problems are obviated by the present invention. A titanium alloy containing aluminum and tin as alpha stabilizers in the form of a 100% scrap charge with a high level of interstitials can be refined into a usable alloy.

SUMMARY OF THE INVENTION

It is an object of this invention to obtain a usable titanium alloy from a refined melt of a 100% scrap charge.

A further object of this invention is to obtain a weldable, forgeable, ductile alloy from alpha stabilized titanium machine turnings. These turnings contain a higher level of interstitials than were present in the starting stock.

A further object of this invention is to obtain an alloy by utilizing blended titanium scrap, that is, alpha form and alpha-beta form scrap.

Still a further object of this invention is to utilize titanium scrap which contains tin as an alloying element.

Another object of this invention is to remove a portion of the alpha stabilizing elements thereby compensating for the effect of higher levels of interstitials on physical properties.

These and other objects are obtained in accordance with the present invention by cleaning titanium alloy machine turnings in an alkaline detergent bath so as to remove machine oils and reduce the initial oxygen content, charging the cleaned material into an electron beam furnace maintained under a hard vacuum, refining the material so as to reduce the amounts of alpha stabilizing metallic elements and controlling refining time and electron beam power level so as to attain a predetermined level of alpha stabilizing metallic elements.

DESCRIPTION OF THE PREFERRED EMBODIMENT

Titanium alloy ingots of the alpha form, i.e., Ti—5Al—2½Sn on the alpha-beta form, i.e., Ti—6Al—4V are frequently employed as the starting stock for titanium product forms. The scrap that is generated during processing generally takes the form of punch-outs, crop-ends or turnings and chips.

The composition of these alloys is:

TABLE I

| N Max | C Max | H₂ Max | Fe Max | Percent O Max | Al | V | Sn | Ti |
|---|---|---|---|---|---|---|---|---|
| | | | | Ti-5Al-2.5Sn | | | | |
| .05 | .10 | .0125 | .50 | .20 | 4.0–6.0 | — | 2.0–3.0 | Bal. |
| | | | | Ti-6Al-4V | | | | |
| .05 | .10 | .0125 | .40 | .20 | 5.5–6.75 | 3.5–4.5 | — | Bal. |

The finished product in many instances is a ring. For example, such a ring could constitute part of a jet engine fan section. A ring of this nature can have an outside diameter of approximately 93 inches. The entire front end of an engine would be suspended from such a component.

To obtain finished rings of this type cast round ingots are used as starting materials. The round ingot is converted into a billet on a hydraulic forging press and cut to a length that provides sufficient stock to yield a ring with the desired dimensions. The interior of the cut billet is then punched out. The billet is now ring forged to the approximate final dimensions and heat treated in order to obtain proper mechanical properties. The ring forging is now machined to final dimensions. It is during the various machining operations that turnings and chips accumulate.

Generally speaking processing of this nature creates two types of scrap. The first type includes heavy scrap, e.g., punch-outs and croppings. This scrap can be directly remelted into prime ingot stock because there is no change in the alloy composition. The second type includes light scrap, e.g., scale and machine turnings. It is the recovery of a useful alloy from this type of scrap which constitutes the invention described and claimed herein.

Chemically pure titanium exhibits unsatisfactory mechanical properties. These properties can be improved in titanium based alloys by the use of appropriate alloy additions.

It is well known in the art that the properties of titanium alloys are directly related to their microstructure. The alpha, or single-phase alloys are weldable with good ductility and two phase or the alpha-beta alloys are stronger than the one phase alloys.

The alpha alloys have two main advantages: weldability and high temperature strength. Alloying elements in solution strengthen alpha-phase alloys. Aluminum has been found to be the most effective strengthener of these alloys. Carbon, oxygen and nitrogen also act as strengtheners. However, these elements including aluminum are only effective within certain limits.

Tin can be considered to mildly affect the properties of alpha alloys. Tin does help to overcome the embrittling effect of aluminum when the aluminum content is more than about 6%.

During processing, titanium alloys are embrittled by contamination with oxygen, carbon, hydrogen and nitrogen. The alloy is contaminated by these elements by exposure to water vapor, oils and other hydrocarbons primarily at elevated temperatures.

Since carbon, nitrogen and oxygen act to strengthen titanium alloys, the combination of these elements with the normal alloying elements, e.g., aluminum and tin, produces an undesirable embrittling effect. That is, when aluminum, tin and the interstitial elements including oxygen, carbon and nitrogen, are maintained within definite prescribed ranges desirable properties are obtained. However, when these interstitials exceed these ranges the physical properties are degredated. For instance an increase in the oxygen content from 0.20 to 0.30%, in a Ti—5Al—2½Sn alloy can result in a tensile strength increase of approximately 14,000 psi. Similarly increasing the other interstitials will also elevate the tensile strength with a concomitant loss in ductility.

After a ring is machined the scrap is collected and accumulated with scrap of like nominal analysis. When a sufficient amount of scrap has been accumulated it is processed into a usable product in a manner as hereinafter more fully described.

The turnings are cleaned in an alkaline detergent solution maintained at 80°–90°C. Cleaning accomplishes the following purposes (a) removal of loose scale and tool bit particles, (b) removal of machine oils and other hydrocarbons, and (c) lowers the oxygen content on the surface. The oxygen content, however, still remains higher than the oxygen content of the original cast ingot.

Cleaning also insures that the turnings will travel smoothly down a furnace feed mechanism into the refining furnace, the possibility of a gas rise during refining that might affect the performance of the electron beam guns by out-gassing is also eliminated.

TABLE II

| | Interstitial Level - Weight Percent | | |
|---|---|---|---|
| | C | N | O |
| Ingot (as received) | <0.15 | <0.07 | <.2000 |
| After Machining | Approx. up to 1.0 | 0.017 | .3200–.4000 |
| After Cleaning | 0.07 | 0.015 | .1800–.2600 |

The cleaned turnings are now charged into a vacuum furnace. The furnace comprises a generally rectangular hearth section and a casting station disposed at the down stream end of the hearth section. The furnace is disposed within a vacuum-tight housing. The turnings are fed into the furnace through a vacuum lock means so as not to impair the vacuum environment within the furnace proper.

Melting of the charge is accomplished by means of electron bombardment heating. The charge starts to melt just as it enters upon the hearth and starts to drip or stream downwardly into the open top of the hearth. As the charge is bombardment heated to drip into the hearth, certain of the elements will start to volatilize and be distilled off. As the molten metal is directed to flow along the open hearth further heating is accomplished by a series of electron beam guns supplying the energy source for heat input. Evacuation of the furnace is accomplished by high speed vacuum pumping means whereby a vacuum of the order of about from $2 \times 10^{-4}$ to about $5 \times 10^{-4}$ torr is established.

Following melting of the charge there will be formed a pool of molten metal extending throughout the hearth. There is directed onto the upper surface of this pool a plurality of electron beams for additional heating of the metal. This heating serves not only to maintain the metal in a molten state, but furthermore to volatilize alpha stabilizing elements so as to compensate for a higher interstitial level.

The inlet end of the hearth may be defined as the end into which initially melted metal drips from the charge. The outlet end of the hearth is disposed some distance therefrom where there is provided means for pouring molten metal into a mold. There can be provided, for example, a tundish or funnel extending from the outlet end of the hearth over a mold into which the molten metal flows. Means is provided for the direction of an electron beam into the open top of the mold so that molten metal flowing from the hearth into the mold is additionally bombarded in the mold itself. This then provides for the maintenance of a molten pool at the top of the mold whereby continuous withdrawal of solidified metal from the bottom of the mold may be accomplished.

Quite clearly the rate of withdrawal of solidified metal must be related to the rate of initial melting of the melt stock and the actual rate of flow of molten metal from the hearth end of the mold.

During passage down the hearth the charged scrap is melted. Aluminum and tin, the alpha-stabilizing elements, are distilled off. By controlling the power level to the electron beam guns an alloy with a predetermined level of alpha stabilizers can be obtained. The ability to distill aluminum off enables the method of this invention to utilize scrap from any titanium alloy which contains more than 2% aluminum.

In order to obtain an alloy that will be ductile, forgeable and corrosion resistant the amount of aluminum and tin must be less than that present in the as-cast ingot. This is due to the higher interstitial level in the charge material, i.e. the scrap. As hereinbefore mentioned it is the combination of the alpha stabilizers and the higher level of interstitials that produces undesirable physical properties.

An alloy with the following composition has been attained by the process of this invention:

TABLE III

| | Al | Sn | Fe | Ni | Percent, Wt. V | Cr | O | N | C | Ti |
|---|---|---|---|---|---|---|---|---|---|---|
| Ingot 4035 | 3.10 | 1.85 | .54 | .20 | .06 | .05 | .230 | .0137 | .0424 | Bal. |

Typical physical properties of this alloy are:

TABLE IV

| Tensile Strength KSI | 0.25% Yield Strength KSI | Elongation % | Reduction of % in Area |
|---|---|---|---|
| 100–130* | 80–130* | 16–30* | 25–50* |

*Dependent on Thermomechanical Treatment

The corrosion resistance of an alloy produced by the method of this invention has been found to be only slightly lower than commercially pure titanium in an oxidizing media, i.e., boiling nitric acid. Furthermore such an alloy is also inert in ferric chloride and exhibits no deterioration in weldments.

Likewise an alloy produced by the method of this invention has been found to be weldable with the Tungsten Inert Gas Welding process using argon shielding.

SPECIFIC EXAMPLE

A 14 inch diameter, 1249 lb. ingot was produced by the method of this invention in the following manner:

A. Source of Melting Charge

1. An $8 \times 8$ inch, 900 lb. billet is obtained from a 26 – 30 inch round ingot, approximately 5% of the ingot being lost in crop ends. This form of scrap can be remelted for prime ingot stock.

2. The center of the billet is punched out thereby resulting in a blank weighing approximately 800 lb. The 100 lb. punch-out can also be remelted into prime ingot stock. The billet is then ring-rolled into a ring blank.

3. The ring blank is rough machined into a ring of approximately 93 inches diameter, weighing approximately 300 lb. The ring is now shipped to a customer for final processing.

4. The customer now machines the ring to final size, 93 inches diameter, weight approximately 150 lb.

Therefore a 900 lb. billet, yields a 150 lb. ring, generating approximately 750 lb. of scrap. Although some scale is formed, for the purposes of this example, this loss is assumed to be in the form of a punch-out and turnings or chips, so that a 900 lb. billet results in approximately 650 lb. of turnings, or 75% of the billet results in turnings.

B. Cleaning Turnings

The turnings are cleaned by tumbling in an alklaine detergent solution maintained at 80°–90°C. After cleaning the turnings are drained, rinsed with water, drained and hot air dried.

C. Charge into Refining Furnace

Approximately 1742 lbs. of cleaned Ti—5Al—2½Sn turnings are placed into a furnace feed system and thereafter gradually fed into a furnace maintained under a vacuum of $2 \times 10^{-4}$ torr. As the turnings enter the inlet end of the hearth they start to melt. As hereinbefore described the cleaned turnings feed smoothly down the hearth with minimal outgassing. In this particular example a hearth measuring approximately 15 × 25 inches was utilized. Electron beam energy input was correlated to the hearth area.

The charge was melted and maintained in a molten condition by the bombardment of four electron beam guns. At the outlet end of the hearth there is provided a casting station comprising a tundish and a mold for casting a 14 inch diameter ingot. Two electron beam guns direct a pair of electron beams onto the open top of the mold so as to insure proper feeding of the molten metal into the mold and also prevent the formation of shrinkage cavities.

The total power level from the six electron beam guns is approximately 388 KW. The chemical analysis of this ingot appears in Table III of this specification.

Electron beam power level, casting rate and hearth geometry can all be varied in order to attain different ingot analyses. The charge of this specific example yielded 1670 lb. of product comprising two skulls and a 1249 lb. ingot. There was also a 4.1% melt loss.

The hereinbefore described ingot was obtained from Ti—5Al—2½Sn scrap. It should be understood that a similar ingot can be obtained from a 100% scrap charge of Ti—6Al—4V scrap or from blended scrap. An alloy obtained from blended scrap would contain both alpha and beta stabilizers.

It will be evident that as a result of this invention it has been made possible to obtain a ductile, corrosion resistant and weldable titanium alloy from heretofore worthless scrap. This is attractive from both an economical and ecological standpoint. Objectionable piles of scrap can now be converted into useful product forms.

It is to be understood that the invention is not limited to the particular embodiments disclosed, but may be used in other ways without departure from the scope defined by the following claims.

I claim:

1. The method of obtaining a weldable, forgeable, ductile, corrosion resistant product alloy from scrap metal alloy of a major component of titanium having additives including at least in excess of 2 per cent of aluminum, and comprising not in excess of about 2 per cent interstitial impurities including one or more of the elements nitrogen, carbon, hydrogen and oxygen, which comprises the steps of:

cleansing the said scrap metal to remove scale comprising oxides and nitrides and hydrocarbons, charging said cleansed scrap metal into a furnace in a vacuum-tight housing evacuated to a pressure not exceeding about $5 \times 10^{-4}$ torr, said furnace comprising an open-faced hearth section having an inlet end and a casting station spaced apart from and disposed downstream from said inlet end, melting the said scrap metal charge in said furnace by electron beam bombardment at the inlet end of said hearth section thereby causing said molten charge to drip down onto said open-faced hearth section to form a stream flowing along said hearth section in the direction of said casting station, exposing said molten scrap stream flowing along said hearth section to further electron beam bombardment at one or more points spaced apart from said inlet end causing the higher vapor pressure elements thereof including at least a portion of said aluminum to become volatilized and distilled off, and collecting the remaining portion of said molten scrap stream in said casting station permitting it to flow into and solidify in a mold.

2. The method as defined in claim 1 wherein said scrap metal is cleansed in a detergent maintained at a temperature of between 80° and 90° centigrade.

3. The method as defined in claim 1 wherein said furnace is evacuated to a pressure not exceeding about $2 \times 10^{-4}$ torr.

4. The product of the process of claim 1.

5. A method as defined in claim 1 in which the scrap metal alloy comprises a blend of titanium alloys having substantially the formulation Ti—5Al—2 ½Sn and Ti—6Al—4V.

6. A method as defined in claim 1 wherein said scrap metal alloy consists essentially of the alloy Ti—5Al—2 ½Sn.

7. A method as defined in claim 1 wherein said scrap metal alloy consists essentially of the alloy Ti—6Al—4V.

8. A method as defined in claim 1 wherein said scrap metal alloy comprises primarily machine turnings and chips.

9. A method as defined in claim 1 wherein said scrap metal alloy contains between about 4 and 6 percent by weight of aluminum, between about 2 and 3 percent by weight of tin, between about 0.18 and 0.40 percent by weight of oxygen and the balance titanium.

10. A method as defined in claim 1 in which the composition of said product alloy falls essentially by weight percent within the limits 1–3.5% Al, 1.3–2.5% Sn, 0.23–0.32% oxygen and the balance Ti.

* * * * *